United States Patent [19]

Seiler et al.

[11] Patent Number: 5,486,759
[45] Date of Patent: Jan. 23, 1996

[54] DEVICE FOR DETECTING THE MOVEMENT OF A MOVABLE COMPONENT AND SIGNALLING THE DETECTED MOVEMENT OVER A SINGLE LINE

[75] Inventors: Hartmut Seiler, Baden-Baden; Guenter Haderer, Buehl; Volker Aab, Sasbach; Cornelius Peter, Buehl-Neusatz, all of Germany

[73] Assignee: Robert Bosch GmbH, Stuttgart, Germany

[21] Appl. No.: 138,208

[22] Filed: Oct. 20, 1993

[30] Foreign Application Priority Data

Oct. 21, 1992 [DE] Germany ............ 42 35 471.4
Mar. 13, 1993 [DE] Germany ............ 43 08 030.8

[51] Int. Cl.⁶ .............. G01P 13/04; G01B 7/30; G01B 7/02; H02P 7/00
[52] U.S. Cl. .............. 324/207.2; 318/466; 318/489; 324/165; 324/207.25; 307/122
[58] Field of Search .................. 324/160, 163, 324/165, 166, 173, 174, 207.2, 207.21, 207.25; 307/122; 340/672; 364/561, 565; 318/461, 466, 467, 470, 489

[56] References Cited

U.S. PATENT DOCUMENTS

| | | | |
|---|---|---|---|
| 3,728,565 | 4/1973 | O'Callaghan | 324/165 X |
| 3,849,724 | 11/1974 | Ghibu et al. | 324/207.2 X |
| 3,944,923 | 3/1976 | Luteran | 324/165 |
| 4,142,152 | 2/1979 | Fincher | 340/672 X |
| 4,415,856 | 11/1983 | Welles | 324/207.25 |
| 4,629,982 | 12/1986 | Kieslich | 340/672 X |
| 4,785,242 | 11/1988 | Vaidya et al. | |
| 5,252,919 | 10/1993 | Uemura | 324/207.25 |
| 5,304,926 | 4/1994 | Wu | 324/207.2 |

FOREIGN PATENT DOCUMENTS

| | | |
|---|---|---|
| 0363512A1 | 4/1990 | European Pat. Off. |
| 0412200A1 | 2/1991 | European Pat. Off. |
| 0473068A1 | 3/1992 | European Pat. Off. |
| 2824697 | 10/1979 | Germany |
| 3938057A1 | 5/1990 | Germany |
| 9012217 U | 12/1990 | Germany |
| 0063763 | 5/1980 | Japan ............ 324/165 |

OTHER PUBLICATIONS

Philips Semiconductors, "KMI 10/1 Integrated Rotational Speed Sensor", *Philips*, SC 17, Sep. 1992, pp. 2–12.
U. Tietze et at, "Halbleiterschaltungstechnik" (Semiconductor Circuit Technology), *Springer Verlang*, 5th Edition, 1980, pp. 54 and 112.

*Primary Examiner*—Gerard R. Strecker
*Attorney, Agent, or Firm*—Spencer, Frank & Schneider

[57] ABSTRACT

A device for detecting the movement of a movable component in that the position signals furnished by two position sensors are added to form a signal that is conducted through a line to an evaluation arrangement. The position ranges associated with the position sensors have an overlap region. Different discrete values are assigned to the position signals and can be evaluated easily in the evaluation arrangement.

14 Claims, 5 Drawing Sheets

FIG. 6

DEVICE FOR DETECTING THE MOVEMENT OF A MOVABLE COMPONENT AND SIGNALLING THE DETECTED MOVEMENT OVER A SINGLE LINE

CROSS REFERENCE TO RELATED APPLICATION

This application is related to commonly owned U.S. patent application Ser. No. 08/138,093 filed concurrently by Volker Aab.

This application claims the priority of application Ser. No. P 42 35 471.4, filed Oct. 21, 1992, and P 43 08 030.8, filed Mar. 13, 1993, in the Federal Republic of Germany, the subject matter of which is incorporated herein by reference.

BACKGROUND OF THE INVENTION

The present invention is based on a device for detecting the movement of a movable component of the type including a first position sensor which puts out a signal that is assigned to at least a first position range and a second position sensor which puts out a signal that is assigned to at least a second position range.

The in-house publication by PHILIPS, Philips Semiconductors, entitled KMI 10/1 Integrated Rotational Speed Sensor, SC 17, September 1992, discloses a sensor which detects the number of revolutions of a rotating component. The sensor element employed is a Hall sensor whose output signal is fed to a signal processing arrangement. The signal processing arrangement includes a filter for suppressing electromagnetic interference signals, an amplifier and a Schmitt trigger. The output signal of the Schmitt trigger switches a current source which admits a defined current between two current supply terminals. A further current source is included in the energy supply circuit of the sensor. The further current source keeps the current required to supply the sensor with energy at a constant value. An evaluation arrangement, not described in greater detail, evaluates the current flowing through one of the two current supply lines. The evaluation arrangement converts the change in current impressed by the switched current source, which is actuated by the Schmitt trigger, in one of the current supply lines into a number of revolutions signal.

German Utility Model Patent DE-U 90 12 217.8 discloses an arrangement which includes an electric motor drive for opening and closing the windows in a motor vehicle. A central device equipped with control and evaluation arrangements is connected with several drive units which are disposed in the doors of the motor vehicle. The drive units include an electric motor and a sensor arrangement. The sensor arrangement detects the number of revolutions of the drive. Five connecting lines are provided between the central device and each drive unit for the transmission of signals and energy.

SUMMARY AND ADVANTAGES OF THE INVENTION

It is an object of the present invention to simplify the cabling efforts in a device for detecting the movement of a movable component, with the device being of the type which includes a first component provided with a sensor arrangement including first and second position sensors as mentioned above, and a second component which is separated or remote from the first component and which includes an evaluation arrangement.

The above object generally is achieved according to the present invention by a device for detecting the movement of a movable component, with the device comprising a sensor arrangement including a first position sensor which puts out a first signal that is assigned to at least a first position range of the movable component, a second position sensor which puts out a second signal that is assigned to at least a second position range of the movable component, with the first and second position ranges having an overlapping region and with the respective position signals put out by the first and second sensors being associated with discrete, different values, and wherein the discrete values are added together and fed by way of a signal line to an evaluation arrangement.

The device according to the invention has the advantage that only one connecting line is required to transmit signals between the sensor arrangement, which includes at least two position sensors, and the evaluation arrangement which determines, for example, a speed and a direction of movement from the signals put out by the position sensors. The assignment of discrete, different values to the signals put out by the two sensors permits easy signal processing in the sensor arrangement by means of switched current sources or switched voltage sources. The transmission of signals from the sensor arrangement to the evaluation arrangement is set at a few different, discrete signal levels. With this measure it is possible to realize great strength against interference signals. This signal transmission is advantageous particularly if the signal is further processed in a digital manner.

Advantageous modifications and embodiments of the device according to the invention are defined in the dependent claims.

In one advantageous embodiment, the sensors are configured as magnetic field sensitive sensors. Particularly suitable are Hall effect sensors which are available at a favorable price and are highly reliable in operation.

Another advantageous embodiment provides that a discrete value associated with one sensor signal has twice the level of the other discrete value associated with the other sensor signal. With this measure, the detection of the different signal levels is as reliable as possible.

The signal transmission between the sensor arrangement and the evaluation arrangement can be effected by means of an impressed voltage signal or an impressed current signal. The impressing of the current signal, preferably by means of two switched current sources, has the advantage that coupled-in interference voltages or, for example, different reference potentials between the evaluation and sensor arrangement have no influence on the transmission.

A modification of the signal transmission with impressed current provides for the use of a current mirror circuit in the evaluation arrangement. The current mirror circuit permits precise conversion of the current signal into a voltage signal which is more easily managed in the further evaluation than a current signal.

Another modification relates to supplying the sensor arrangement and, insofar as necessary, the sensor elements with energy. This modification provides for the inclusion of the cables for an electric motor which drives the movable component.

According to a first embodiment of this modification, the energy supply of the sensor arrangement is provided by way of the signal line and by way of at least one of the lines leading to the electric motor. In this embodiment, the current flowing in the signal line is composed of the current for the energy supply for the sensor arrangement and the current provided for the signal transmission. The advantage of this first embodiment is that, with a given short-circuit in the electric motor as actuated by a control device provided for controlling the motor in order to quickly brake the motor, the energy supply for the sensor arrangement through lines leading to the motor is ensured without further measures. A possibly provided energy reservoir associated with the sensor arrangement can therefore have small dimensions or be omitted entirely.

An alternative embodiment provides for supplying energy to the sensor arrangement by way of the two lines leading to the electric motor. This embodiment is particularly suitable for predetermining an impressed voltage in the signal line for signal transmission, with the voltage being determinable independently of any other required supply voltage.

The device according to the present invention for detecting the movement of a movable component is particularly suitable for use in an adjustment drive preferably arranged in motor vehicles. The small number of connecting lines between the first component and at least one second component results in savings of costs in mass production and increased ease of access.

Further advantageous features and improvements of the device according to the invention are defined in the further dependent claims.

BRIEF DESCRIPTION OF THE DRAWINGS

The device according to the present invention for detecting the movement of a movable component will now be described in greater detail with reference to the drawing figures.

DETAILED DESCRIPTION OF THE PREFERRED EMBODIMENTS

Figure 1:
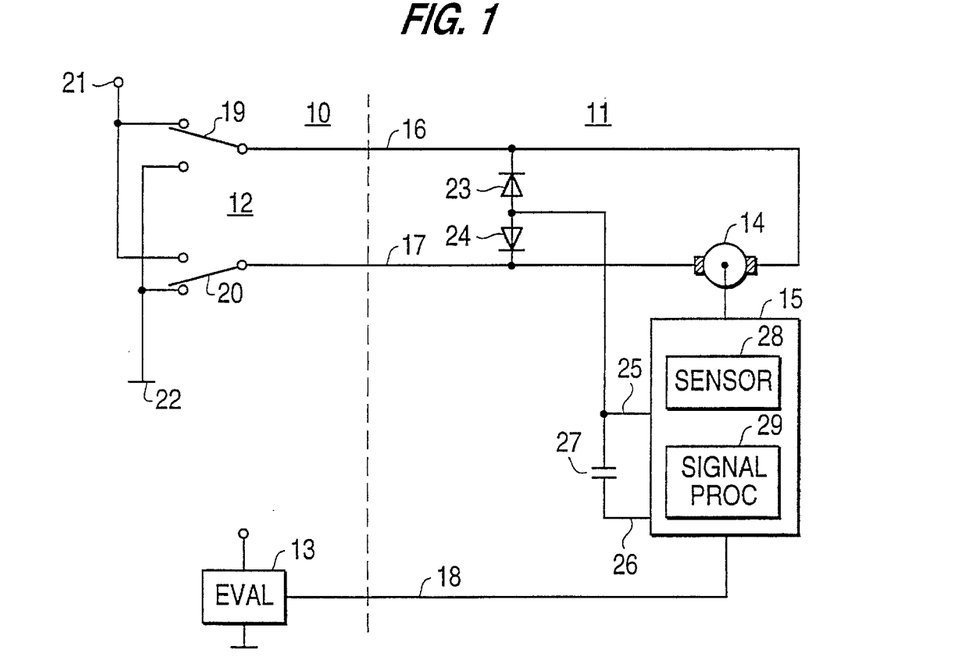
FIG. 1 depicts an embodiment of a device according to the invention for detecting the movement of a movable component.

FIG. 1 shows an electric motor drive composed of a first component 10 and a second component 11 which is separated or remotely spaced from the first component 10. The two components 10 and 11 are shown separated from each other by a dashed line. The first component 10 includes a control arrangement 12 and an evaluation arrangement 13. The second component 11 includes an electric motor 14 and a sensor arrangement 15.

The control arrangement 12 is connected with the electric motor 14 disposed in the second component 11 by means of two connecting lines 16 and 17. A third line 18 connects the evaluation arrangement 13 included in the first component 10 with the sensor arrangement 15 included in the second component 11.

Control arrangement 12 includes a first switching means 19 and a second switching means 20 which connect each of the connecting lines 16 and 17 either with an operating voltage terminal 21 or to ground 22. Connecting lines 16 and 17 are each connected with a respective rectifier diode 23 or 24 whose anodes are each connected with a first current supply terminal 25 of sensor arrangement 15. A capacitor 27 is connected between the first current supply terminal 25 and a second current supply terminal 26 of the sensor arrangement 15. Sensor arrangement 15 includes a sensor 28 which is in operative connection with electric motor 14. Sensor arrangement 15 further includes a signal processing arrangement 29.

Figure 2:
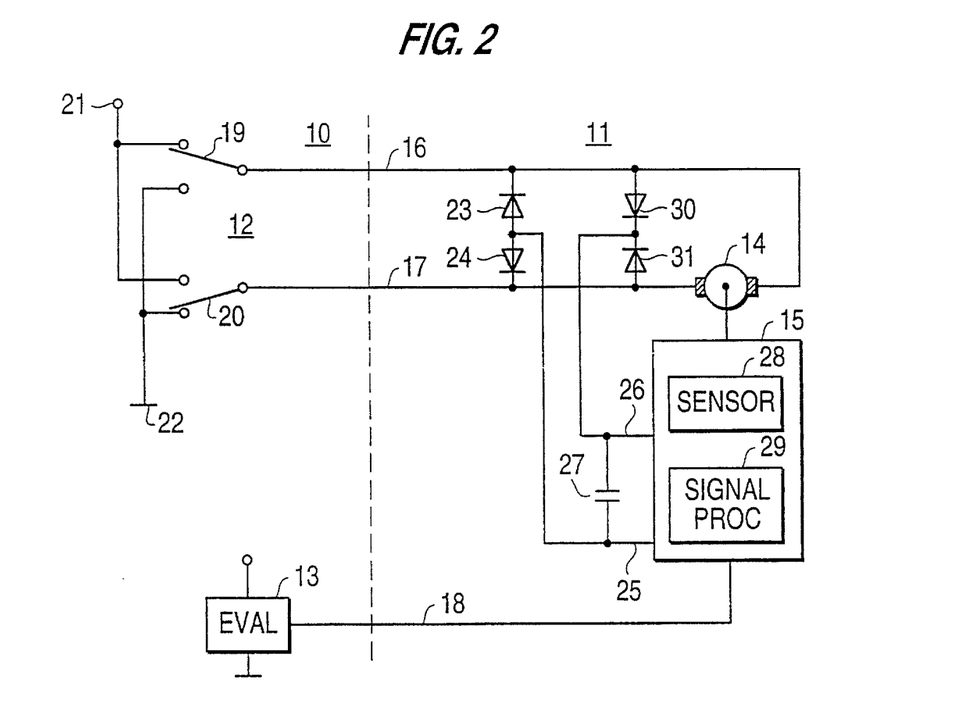
FIG. 2 depicts another embodiment of a device according to the invention for detecting the movement of a movable component.

In the block circuit diagram shown in FIG. 2 for the electric motor drive including the two components 10 and 11, those components which coincide with components shown in FIG. 1 are given the same reference numerals. In this embodiment the second current supply terminal 26 of sensor arrangement 15 is connected by way of further rectifier diodes 30 and 31 with the respective connecting lines 16 and 17, with the second current supply terminal 26 being connected with the respective cathode terminals of the diodes 30 and 31.

Figure 3:
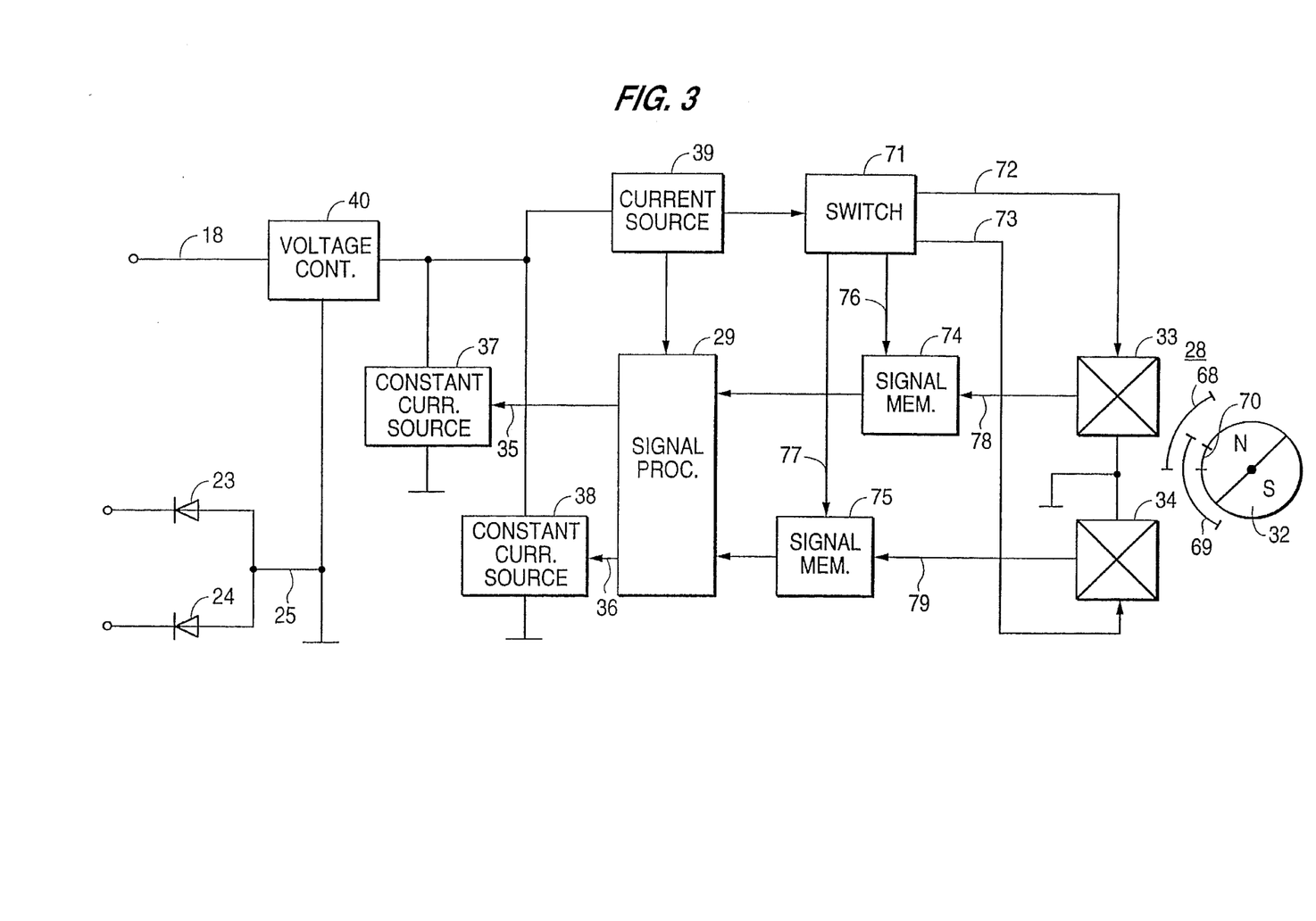
FIG. 3 depicts an embodiment of a sensor arrangement for the embodiments of FIGS. 1 and 2.

FIG. 3 depicts an embodiment of the sensor arrangement 15 shown in FIGS. 1 and 2. Sensor 28 includes at least one permanent magnet 32 driven by electric motor 14 and cooperating with a first magnetic field sensitive element 33 and a second magnetic field sensitive element 34. The first element 33 puts out a first position signal 78 for a first signal memory 74. The first position signal 78 is associated with a first position range 68. The second element 34 puts out a second position signal 79 for a second signal memory 75. The second position signal 79 is associated with a second position range 69. Position ranges 68 and 69 overlap in a region 70. Output signals from the two signal memories 74 and 75 are fed to the signal processing arrangement 29 which makes available control signals 35 and 36 for controlled current sources 37 and 38.

A further current source 39 is provided to supply magnetic field sensitive elements 33 and 34 and signal processing arrangement 29 with energy. The further current source 39 supplies energy to a switch 71 which conducts the energy through lines 72 and 73 to the respective magnetic field sensitive elements 33 and 34. Switch 71 also feeds memory signals 76 and 77 to signal memories 74 and 75. The third or signal line 18 leads to a voltage controller 40 whose output is connected with current sources 37 and 38 and with the further current source 39. Voltage controller 40 is also connected with the first current supply terminal 25 which leads to the anode terminals of the rectifier diodes 23 and 24. Diodes 23 and 24 are shown again in FIG. 3 to illustrate that the magnetic field sensitive elements 33 and 34 shown in FIG. 3, the diodes 23 and 24, 30 and 31, and the other function blocks shown in FIG. 3, except for permanent magnet 32, may be accommodated within an integrated circuit.

Figure 4:
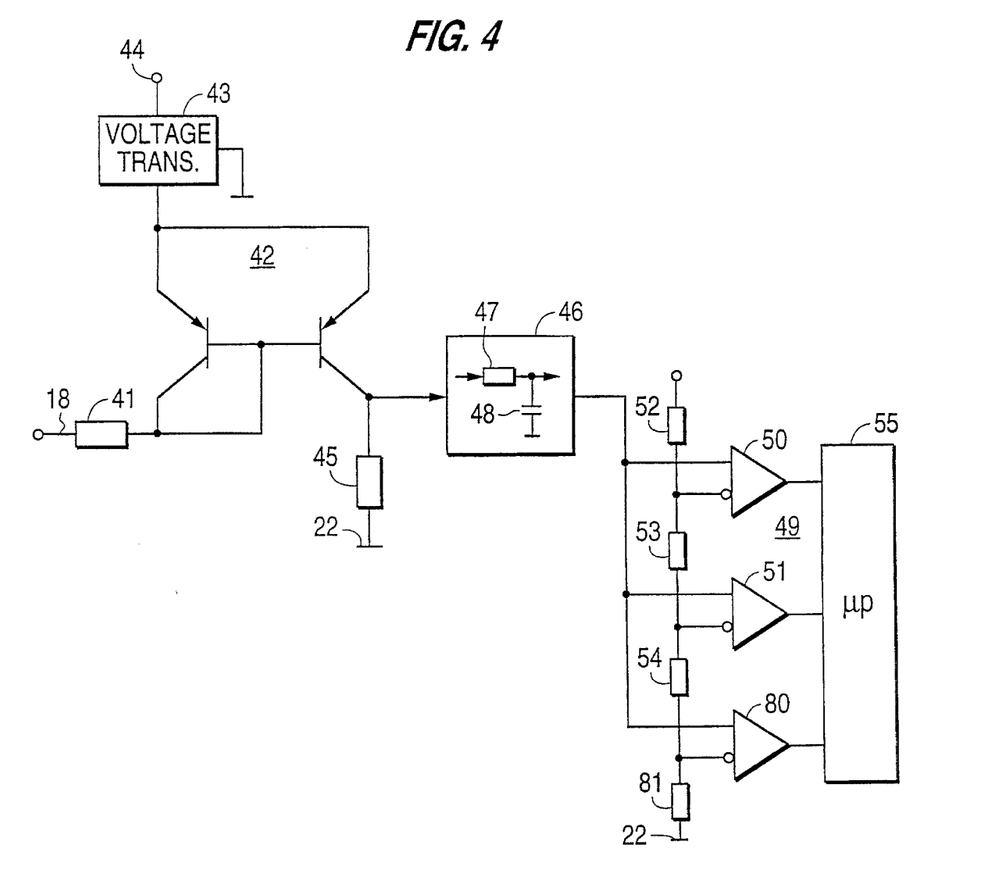
FIG. 4 depicts an embodiment of an evaluation arrangement for the embodiments of FIGS. 1 and 2.

FIG. 4 depicts an embodiment of evaluation arrangement 13. The third line 18 leads by way of a resistor 41 to a current mirror circuit 42. The energy source is a voltage transformer circuit 43 which transforms the voltage applied across a current supply terminal 44 to a higher potential. A voltage corresponding to the current flowing in the third line 18 appears across an operating resistor 45 at the output of the current mirror circuit. The voltage signal appearing at operating resistor 45 is fed by way of a lowpass filter arrangement 46, including the combination of a resistor 47 and a capacitor 48, to a comparator arrangement 49. Comparator arrangement 49 includes three differential amplifiers 50, 51 and 80 whose inverting inputs are each connected with a resistance dividing chain of four resistors 52, 53, 54 and 81. The non-inverting inputs of differential amplifiers 50, 51 and 80 are connected with the output of lowpass filter 46. Differential amplifiers 50, 51 and 80 feed their output signals to a microprocessor 55.

Figure 5:
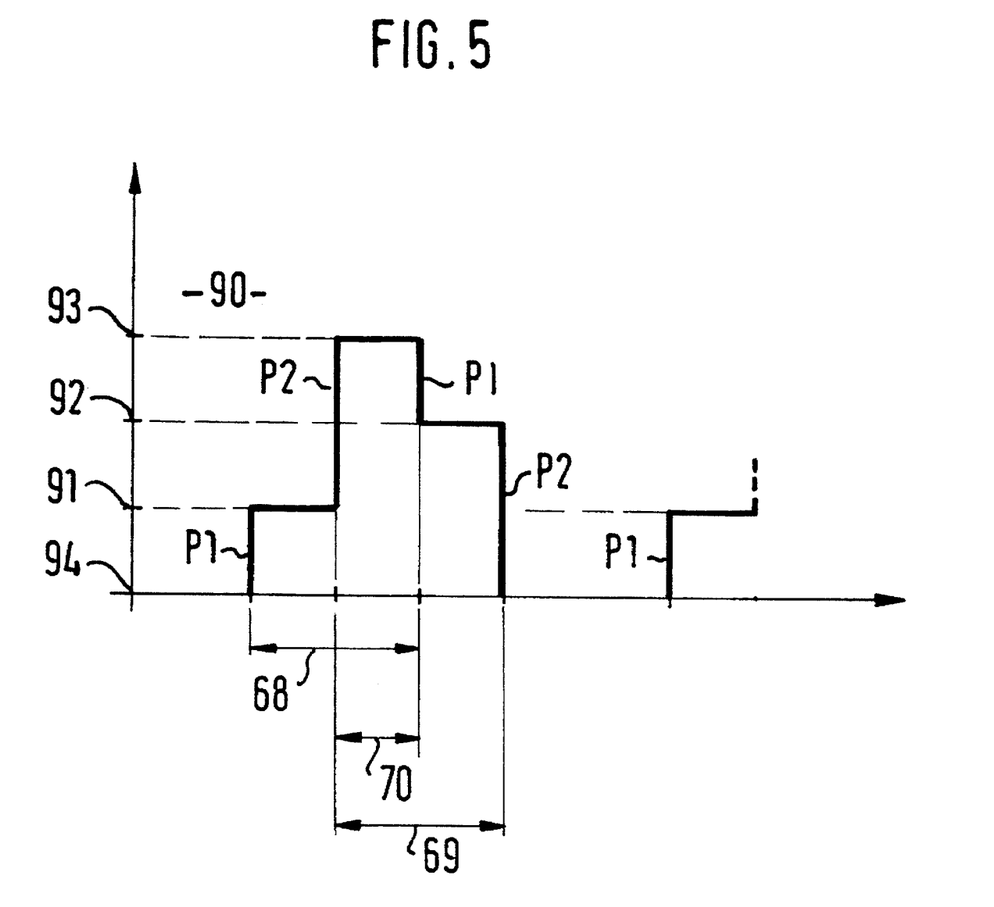
FIG. 5 shows a position signal as a function of a locus produced by the sensor arrangement according to the invention.

FIG. 5 shows a position signal 90 that is transmitted over the third line 18. Position signal 90 may take on a first signal level 91, a second signal level 92, a third signal level 93 or a fourth signal level 94. FIG. 5 also shows the position ranges 68 and 69 associated with the different levels 91, 92, 93 and 94, and the overlap region 70. Upon a first change of level P1 in the first position signal 78, level 94 changes to the first level 91. Upon the next change in level P2, the level changes from the first level 91 to the third level 93. Upon the next change of level, the level changes again from the third level 93 now to the second level 92. Since this change coincides in magnitude with the first level change P1, this change is also marked P1. Then the level changes from the second level 92 back to the fourth level 94. Since this change in level coincides in magnitude with level change P2, the latter level change is also marked P2.

Figure 6:
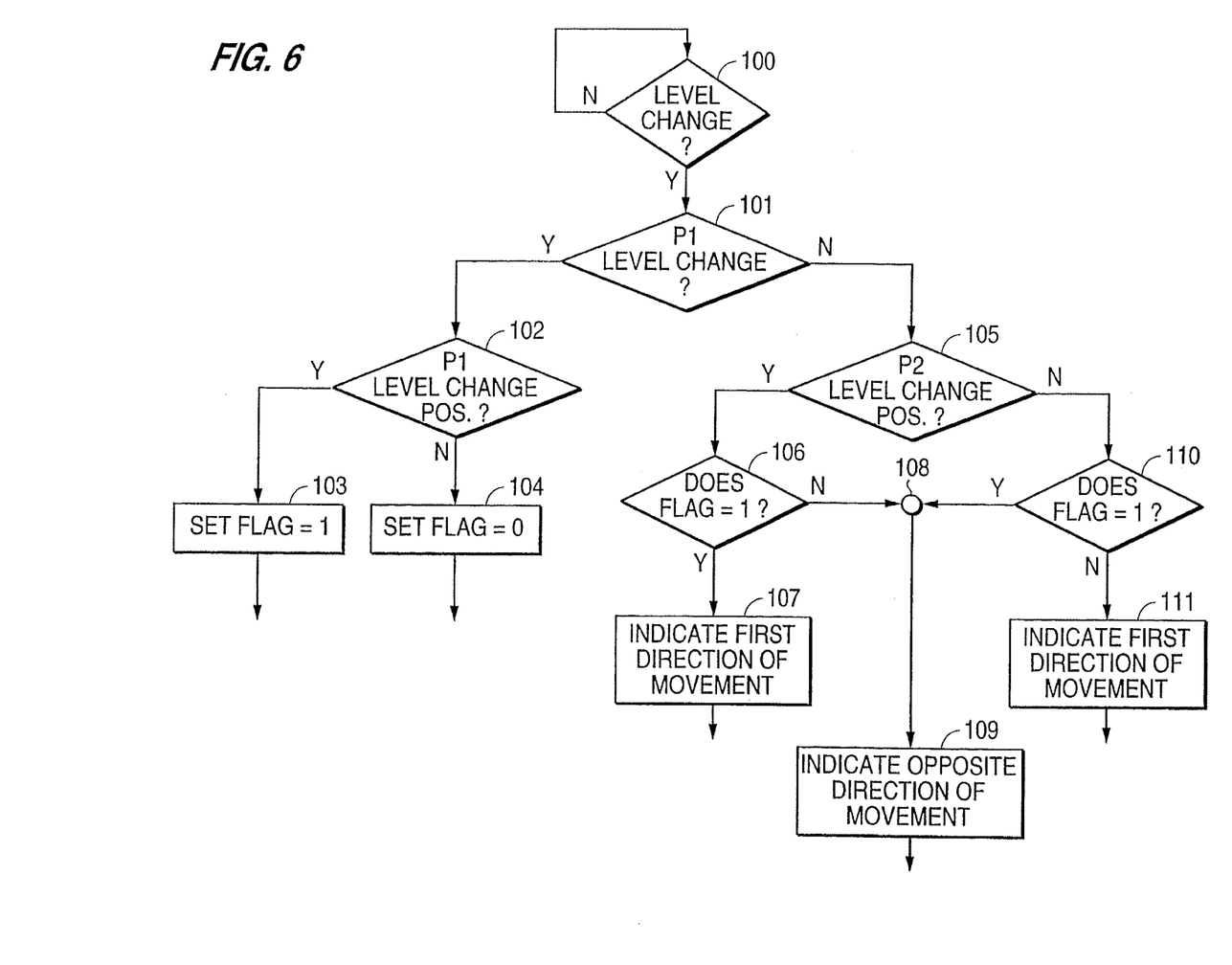
FIG. 6 is a flow chart for a process taking place in the evaluation arrangement according to the invention.

The flow chart shown in FIG. 6 is based on a method realized in the evaluation arrangement 13. It can be used to determine the direction of movement of a movable component by way of the movement of permanent magnet 32. The flow chart will be described below in conjunction with a description of the method.

First the operation of the device according to the invention for detecting the movement of a movable component as shown in FIGS. 1 and 2 will be described.

The control arrangement 12 as well as the evaluating arrangement 13 included in the first component 10 are accommodated, for example, in a central device to which at least one second component 11 is connected. The second component 11 is preferably contained in a housing which also accommodates the electric motor 14 and the sensor arrangement 15 installed in the immediate vicinity 10 of the motor 14. Connecting lines 16 and 17 as well as the third line 18 lead to each connected second component 11.

Control arrangement 12 serves the purpose of providing the operating voltage across the connecting lines 16 and 17 for electric motor 14 in such a way that electric motor 14 can be operated in the one or the other direction of rotation. Control arrangement 12 includes the two switching means 19 and 20 which connect connecting lines 16 and 17 either with the operating voltage terminal 21 or to ground 22. Switching means 19 and 20 may also be operated such that both connecting lines 16 and 17 can be switched by switching means 19 and 20 either simultaneously to ground 22 or simultaneously to the operating voltage terminal 21. Electric motor 14 can thus be short-circuited. Thanks to this measure, it is possible to quickly brake electric motor 14.

The electric motor 14 in second component 11 is provided to drive a movable component not shown in greater detail. Such a movable component is, for example, a component of an adjustment drive preferably provided in a motor vehicle. The movable component is, for example, an antenna, a folding convertible roof, a window, a rear view mirror, part of a seat and/or a sunroof.

Signal transmission from the second component 11 to the first component 10 takes place through the third or signal line 18. A signal is transmitted which enables evaluation arrangement 13 to determine the movement of the movable component. Evaluation arrangement 13 determines, for example, the position and speed or, for example, the number of revolutions and the direction of rotation of a rotating component. In dependence on the determined signal, for example, electric motor 14 is actuated in the one or in the other direction. For example, a number of revolution signal and a rotation direction signal may also be realized to protect against jamming to prevent the catching of objects or body parts between the movable component and another, also non-illustrated fixed component.

The signal processing arrangement 29 included in sensor arrangement 15 generally requires an energy supply. Sensor 28 also frequently requires its own energy supply. The magnetic field sensitive elements 33 and 34 may also have an energy requirement. For a magnetic field sensitive element based on the Hall effect, a current must be made available. Magnetoresistive elements must also be traversed by a current in order to provide a sensor signal.

In the embodiment shown in FIG. 1, energy is supplied to sensor arrangement 15 by way of the third line 18 and by way of at least one of the two connecting lines 16 or 17. The first current supply terminal 25 of sensor arrangement 15 is connected by way of diodes 23 and 24, which act as rectifiers, with the connecting lines 16 and 17 leading to the electric motor 14. Initially it is ensured during operation of electric motor 14 that the required potential is present in one of the two connecting lines 16 and 17. In the illustrated embodiment, it is the negative potential. Energy supply is also ensured when electric motor 14 is standing still because the switching means 19 and 20 connect at least one of the two lines 16 or 17 to ground 22, with ground 22 corresponding to the negative potential. In the case where the electric motor 14 is short-circuit to ground 22, both lines 16 and 17 carry negative potential. The positive potential is supplied to sensor arrangement 15 by way of the third line 18. Evaluation arrangement 13 connects the third line 18 by way of a circuit, which will be described in greater detail in connection with the description of FIG. 4, with a current supply terminal that has the matching positive potential. If necessary, a capacitor 27 is provided which is able to store energy. Capacitor 27 is connected between the first current supply terminal 25 and the second current supply terminal 26 of sensor arrangement 15. The second current supply terminal 26 may, for example, be internally connected directly with the third line 18. It may be necessary for energy to be stored in capacitor 27 for a short period of time in an operating state in which, in order to brake electric motor 14, the two switching means 19 and 20 connect the two connecting lines 16 and 17 simultaneously with operating voltage terminal 21 which carries positive potential. In this case, capacitor 27 must make energy available to sensor arrangement 15 until electric motor 14 is braked. If other measures are taken, which will be described in greater detail in connection with the circuit diagram shown in FIG. 4, capacitor 27 may be omitted entirely in this operating case as well.

The difference between the electric motor drive embodiments shown in FIG. 1 and FIG. 2 is essentially that, in the embodiment shown in FIG. 2, the energy for the sensor arrangement 15 is supplied entirely through the two connecting lines 16 and 17 leading to the electric motor 14. Rectifier diodes 23 and 24 make available a negative potential at the first current supply terminal 25 and rectifier diodes 30 and 31 provide a positive potential at the second current supply terminal 26. The supply with energy is always ensured during operation of electric motor 14. In order to be able to have a sufficiently large energy reserve even if it is intended to short-circuit electric motor 14, energy storage capacitor 27 is required whenever sensor arrangement 15 is to transmit signals to evaluation arrangement 13 also during braking of electric motor 14. In the embodiment of the electric motor drive shown in FIG. 2, sensor arrangement 15 impresses the voltage into the third line 18. This configuration is possible because the third line 18 is now required only for signal transmission from the second component 11 to the first component 10. Another advantage of this embodiment is the selective determination of the signal levels to be transmitted through the third line 18, regardless of whether current or voltage is involved, to permit easy and reliable evaluation.

The sensor arrangement 15 shown in FIG. 3 is based, for example, on a magnetic field sensor as sensor 28. Sensor 28 and its two magnetic field sensitive elements 33 and 34, preferably Hall elements, put out position signals 78 and 79 to signal memories 74 and 75 as a function of the position of permanent magnet 32. Sensor 28 provides for the availability of a number of revolution signal, a position signal and a direction of rotation signal. Position signals 78 and 79 are fed to signal memories 74 and 75 which store the position signals 78 and 79 for a predetermined period of time as a function of memory signals 76 and 77, respectively. Memory signals 76 and 77 are made available by switch 71 which also controls the energy supply of magnetic field sensitive elements 33 and 34 by way of lines 72 and 73. The current consumption of magnetic field sensitive elements 33 and 34, which are realized as Hall sensors, is essentially determined by the transverse current in elements 33 and 34. Switch 71 switches the supply voltage between the two sensor elements 33 and 34 in periodic time intervals. Signal evaluation occurs only in the element 33 or 34 which is presently supplied with energy. During the time the other element 33 or 34 is supplied with energy, position signals 78 and 79 are intermediately stored in signal memories 74 and 75, respectively. The synchronous actuation of signal memories 74 and 75 with the switching of the energy supply occurs in switch 71. The frequency for switching the energy supply between magnetic field sensitive elements 33 and 34 should be selected to be at least twice as high as the frequency of the expected changes in state of sensor 28. The significant advantage of this measure is the reduction of the total energy consumption which is noted to particular advantage in the concomitant reduction of the current to be transported through the third line 18.

By way of its control signals 35 and 36, signal processing arrangement 29 provides either the voltage present across the third line 18 or the current flowing through the third line 18. In the illustrated embodiment, signal processing arrangement 29 actuates two current sources 37 and 38 which are permanently set to different, discrete current values. Signal processing arrangement 29 includes, for example, amplifier circuits, comparators, filter circuits for the suppression of interference or driver circuits. If the position signals 78 and 79 put out by sensor elements 33 and 34, possibly intermediately stored, are directly suitable to actuate sources 37 and 38, signal processing arrangement 29 may also be omitted entirely. The currents provided by sources 37 and 38 are added in the third line 18.

Therefore, the illustrated arrangement is able to preset the four different levels 91, 92, 93 and 94 shown in FIG. 5. When predetermining the current flowing in third line 18 it is necessary for the current required to supply signal processing arrangement 29 and magnetic field sensitive elements 33 and 34 with energy to have a known value which can be considered in the evaluation arrangement 13. For that reason, the further current source 39 is advantageously disposed in sensor arrangement 15 to keep the supply current independent of the voltage.

An advantageous embodiment provides for the use of a voltage controller 40. Voltage controller 40 gives, on the one hand, a fixed operating voltage for sensor arrangement 15 and magnetic field sensitive elements 33 and 34. On the other hand, it reduces the influence of interfering voltages. Such interferences are, for example, negative pulses which are coupled into sensor arrangement 15 by way of diodes 23 and 24 when electric motor 14 is shut off.

The embodiment of the evaluation arrangement 13 shown in FIG. 4 includes, at its input, a current mirror circuit 42 which converts the current flowing through the third line 18 into a corresponding output voltage across operating resistor 45. A resistor 41 provided at the input end limits the current flowing through third line 18 to a maximum value that is a function of the operating voltage and thus performs a protective function. Current mirror circuit 42 is described in greater detail, for example, in the textbook by U. Tietze and Ch. Schenk, "Halbleiterschaltungstechnik" [Semiconductor Circuit Technology], 5th Edition, published in 1980 by Springer Verlag, pages 54 and 112, so that a detailed description of the circuit is not necessary here. The signal appearing at operating resistor 45 is fed through lowpass filter arrangement 46 to comparator arrangement 49. The lowpass filter arrangement 46 which, in the simplest case, is realized as a lowpass filter of the first order in the form of a combination of a resistor 47 and a capacitor 48, reduces any possibly coupled-in high frequency interference to a harmless dimension. Instead of a first order lowpass filter, it is also possible to provide a higher order lowpass filter or a bandpass filter circuit. The comparator arrangement 49 makes possible the detection of the four different signal levels 91, 92, 93 and 94. The individual levels are determined by resistors 52, 53, 54 and 81 which are connected to act as a voltage divider. The taps of the voltage divider are connected with the inverting inputs of the three differential amplifiers 50, 51 and 80. The output signals of the three differential amplifiers 50, 51 and 80 are fed to the input ports of a microprocessor 55 which performs the further signal evaluation and processing. Microprocessor 55 determines, for example, a number of revolutions and a direction of rotation or a value derived therefrom.

A particularly advantageous modification provides for the use of a voltage transformer circuit 43 in the evaluation arrangement 13. Voltage transformer circuit 43, whose configuration is known, for example, from the already cited textbook by U. Tietze and Ch. Schenk, increases the voltage present across current supply terminal 44 to a higher value. Current supply terminal 44 is generally at the same potential as the operating voltage terminal 21 for the operating voltage of the electric motor 14. Voltage transformer circuit 43 therefore also provides a reliable energy supply to the sensor arrangement 15 and the magnetic field sensitive elements 33 and 34 if the two switching means 19 and 20 connect the electric motor 14 simultaneously with the first operating voltage terminal 21 to short-circuit the motor. Another possibility to ensure the energy supply for sensor arrangement 15, if the two switching means 19 and 20 connect the two connecting lines 16 and 17 simultaneously with the operating voltage terminal 21 in order to brake electric motor 14, is to change the polarity of the third connecting line 18. That is the negative potential is transmitted over the third line 18 while the positive potential is made available by way of at least one of the two connecting lines 16 or 17. In the embodiment shown in FIG. 1, the polarity of diodes 23 and 24 must be changed, and the first current supply terminal 25 of sensor arrangement 15 must be connected with the cathode terminals of diodes 23 and 24.

Moreover, the polarity of the current mirror circuit 42 in the evaluation arrangement 13 must be changed. That is, instead of the PNP transistors shown in FIG. 4, NPN transistors are now employed whose emitters are each connected to ground 22. Operating resistor 45 must be connected with current supply terminal 44.

Instead of the comparator arrangement 59 shown in FIG. 4, it is also possible to feed the signal put out by lowpass filter 46 to an analog/digital converter. The advantage of this embodiment is that an analog/digital converter can be employed which might already be available in microprocessor 55. In this embodiment, comparator arrangement 49 may be omitted entirely.

FIG. 5 shows the position signal 90 transmitted through the third line 18. Signal processing arrangement 29 assigns the different signal levels 91, 92, 93 and 94 to the position signals 78 and 79 which it receives, possibly after intermediate storage in signal memories 74 and 75, respectively. The first level 91 is assigned to the first position range 68 detected by the first magnetic field sensitive element 33. The second signal level 92 is assigned to the second position range 69 detected by the second magnetic field sensitive element 34. Outside of the two position ranges 68 and 69 there occurs the fourth signal level 94. For the overlap region 70, in which both magnetic field sensitive elements 33 and 34 put out a corresponding position signal 78 and 79, the third signal level 93 is assigned. The evaluation of position signal 90 in evaluation arrangement 13 can be realized particularly easily if the first level 91 and the second level 92 are different, discrete values. A particularly simple evaluation becomes possible if the first level 91 has at least approximately twice the value of the second level 92. Instead of the position signal 90 shown in FIG. 5, for which levels 91, 92, 93 and 94 are related to the fourth level 94 as the basic level, it is also possible to determine the basis for first level 91 independently of the basis of second level 92. However, it is important that different level transitions P1 and P2 occur as a function of the direction of rotation in which overlap region 70 is reached.

The method of detecting movement, for example the number of revolutions and the direction of rotation of a movable component from the position signal 90 shown in FIG. 5 will now be described in greater detail with reference to the flow chart shown in FIG. 6.

By means of a query 100 it is determined whether a level change P1 or P2 has taken place. If a change has taken place, a next query 101 determines whether a P1 level change has taken place. If this is the case, i.e. a "yes" (Y) response, the program moves to a query 102 in which it is determined whether the P1 level change was positive. If this is the case, a flag or indication signal is given the value 1 in an assignment step 103. If the P1 level change was negative, an assignment step 104 assigns the value 0 to the flag or indication signal. After completing assignment steps 103 and 104, the program jumps back to query 100.

If it is determined during the next query 101 that no P1 level change took place, a P2 level change must inevitably have occurred. The program therefore checks in a query step 105 whether the P2 level change was positive. If this is correct, query 106 checks whether the flag or indication signal has the value 1. If this is the case, a determination is made in assignment step 107 that a first direction of movement was present. Then the program jumps back to query 100. If the flag signal had the value 0, the program advances to a node 108 which leads to an assignment step 109 in which it is noted that the opposite direction of movement occurred. Then the program jumps back to query 100. If it is determined in query step 105 that the P2 level change was negative, the program continues to query step 110 in which it is determined whether the flag signal has the value 1. If this is not the case, the program moves to assignment step 111 in which it is determined that the first direction of movement has occurred. Then the program jumps back to query 100. If the flag signal has the value 1, the program moves on by way of node 108 to assignment step 109 in which it is noted again that the other direction of movement occurred.

It will be understood that the above description of the present invention is susceptible to various modifications, changes and adaptations, and the same are intended to be comprehended within the meaning and range of equivalents of the appended claims.

What is claimed is:

1. A device for detecting movement of a movable component, said device comprising:

a first position sensor for outputting a first signal corresponding to at least a first position range of the movable component when the first position sensor senses the movable component within the first position range, the first signal having a single first discrete value;

a second position sensor for outputting a second signal corresponding to at least a second position range of the movable component when the second position sensor senses the movable component within the second position range, the second position range having an overlap region with said first position range, said second signal having a single second discrete value which is different from said first discrete value;

means for adding the respective discrete values of said first and second signals to produce a discrete sum signal, and for feeding the discrete sum signal to a single signal line; and an evaluation arrangement connected to said single signal line for receiving and evaluating the sum signal on said single signal line and determining movement of the movable component based on the sum signal.

2. A device according to claim 1, wherein said first and second position sensors are magnetic field sensitive elements.

3. A device according to claim 2, wherein said magnetic field sensitive elements are Hall effect elements.

4. A device according to claim 2, wherein said magnetic field sensitive elements are included in an integrated circuit.

5. A device according to claim 2, further comprising a switch means for switching a supply of energy between said magnetic field sensitive elements in a periodic interval.

6. A device according to claim 1, wherein the means for adding includes means for making the first discrete value output by the first sensor to be a value twice the value of the second discrete value output by the second sensor.

7. A device according to claim 1, wherein said means for adding and feeding includes first and second controlled current sources, the first controlled current source coupled to the first position sensor and the second controlled current source coupled to the second position sensor, first controlled current source being connected to the single signal line and impressing a first predetermined current corresponding to the first discrete value into said single signal line and the second controlled current source being connected to the single signal line and impressing a second predetermined current corresponding to the second discrete value into the single signal line, the sum signal being the sum of the first and second predetermined currents.

8. A device according to claim 7, wherein said evaluation arrangement includes a current mirror circuit connected to said single signal line.

9. A device according to claim 7, wherein said evaluation arrangement includes a circuit means for increasing a voltage across said single signal line corresponding to the first and second predetermined currents impressed on said single signal line.

10. A device according to claim 1, further comprising an electric motor for driving the movable component, the electric motor having connecting lines for supplying energy to the electric motor, and wherein said first and second position sensors are supplied with energy through said single signal line and through at least one of the connecting lines connected to the electric motor.

11. A device according to claim 1, further comprising an electric motor for driving the movable component, the electric motor having connecting lines for supplying energy to the electric motor, and wherein said first and second position sensors are supplied with energy by the connecting lines connected to the electric motor.

12. A device according to claim 1, wherein the movable component is part of an adjustment drive disposed in a motor vehicle.

13. A device according to claim 1, wherein the means for adding the respective discrete values of said first and second signals to produce a discrete sum signal, and for feeding the sum signal to a single signal line produces the discrete sum signal so that it has at least three predetermined signal levels representing different positions of the moveable component.

14. A device according to claim 1, wherein the sum signal has a first predetermined signal level corresponding to the first discrete value, a second predetermined signal level corresponding to the second discrete value and a third predetermined signal level corresponding to when the first and second position sensors sense the movable component within the overlap region.

* * * * *